(12) United States Patent
Nakamura et al.

(10) Patent No.: US 12,461,632 B2
(45) Date of Patent: Nov. 4, 2025

(54) DISPLAY DEVICE

(71) Applicant: Magnolia White Corporation, Tokyo (JP)

(72) Inventors: Masato Nakamura, Tokyo (JP); Kazuyuki Harada, Tokyo (JP); Hiroshi Tabatake, Tokyo (JP); Masayuki Kato, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/437,254

(22) Filed: Feb. 9, 2024

(65) Prior Publication Data

US 2024/0281100 A1   Aug. 22, 2024

(30) Foreign Application Priority Data

Feb. 22, 2023   (JP) ................. 2023-026112

(51) Int. Cl.
*G06F 3/044* (2006.01)
*H10H 29/14* (2025.01)

(52) U.S. Cl.
CPC ......... *G06F 3/0446* (2019.05); *H10H 29/142* (2025.01)

(58) Field of Classification Search
CPC ......... G06F 3/0446; G06F 2203/04112; G06F 3/0412; G06F 3/0443; G06F 3/0448; G06F 3/04164; H10H 29/142; G09G 3/2074; H10K 59/12; H10K 59/40

See application file for complete search history.

(56) References Cited

U.S. PATENT DOCUMENTS

| | | | | |
|---|---|---|---|---|
| 2007/0132620 A1* | 6/2007 | Nakamura | ........... | G09G 3/3688 341/144 |
| 2010/0321355 A1* | 12/2010 | Gotoh | ................. | G02F 1/13338 345/207 |
| 2018/0039360 A1* | 2/2018 | Akimoto | ................ | H10K 59/40 |
| 2020/0235169 A1* | 7/2020 | Miyamoto | ............. | H05B 33/10 |
| 2020/0363905 A1* | 11/2020 | Jo | ......... | H10K 50/844 |
| 2020/0393936 A1* | 12/2020 | Bok | ....................... | G06F 3/0446 |
| 2021/0034184 A1* | 2/2021 | Lin | ........................ | G06F 3/0412 |
| 2021/0042493 A1* | 2/2021 | Lius | ...................... | G09G 3/2003 |
| 2021/0183273 A1* | 6/2021 | Lius | ...................... | G06F 3/0445 |
| 2022/0069027 A1* | 3/2022 | Wang | ................... | H10K 50/813 |
| 2022/0100346 A1* | 3/2022 | Kim | ...................... | H10K 59/131 |
| 2022/0197419 A1* | 6/2022 | Sun | ........................ | G06F 3/0412 |
| 2022/0215804 A1* | 7/2022 | Lee | ....................... | H10K 59/352 |

(Continued)

FOREIGN PATENT DOCUMENTS

JP   2019-074709 A   5/2019

*Primary Examiner* — Jose R Soto Lopez
(74) *Attorney, Agent, or Firm* — XSENSUS LLP

(57) ABSTRACT

A display device includes at least one pixel including a plurality of sub-pixels, and a linear sensor electrode extending along a boundary of the plurality of sub-pixels and surrounding a periphery of the at least one pixel. The sensor electrode has at least one cut-off portion at the boundary of the plurality of sub-pixels. The sensor electrode can include a first sensor electrode extending along the boundary of a plurality of sub-pixels and a second sensor electrode that surrounds the periphery of at least one pixel continuous from the first sensor electrode, and the cut-off portion can be located at the boundary of the first sensor electrode with the second sensor electrode.

3 Claims, 16 Drawing Sheets

(56) References Cited

U.S. PATENT DOCUMENTS

| | | | |
|---|---|---|---|
| 2022/0334678 A1* | 10/2022 | Long | G06F 3/0443 |
| 2022/0413656 A1* | 12/2022 | Wang | G06F 3/0443 |
| 2023/0089207 A1* | 3/2023 | Lee | G06V 40/1318 |
| | | | 345/211 |
| 2023/0134963 A1* | 5/2023 | Bok | G06F 3/0443 |
| | | | 345/174 |
| 2023/0360427 A1* | 11/2023 | Kim | G09G 3/3233 |
| 2024/0160323 A1* | 5/2024 | Lee | G06F 3/04164 |

* cited by examiner

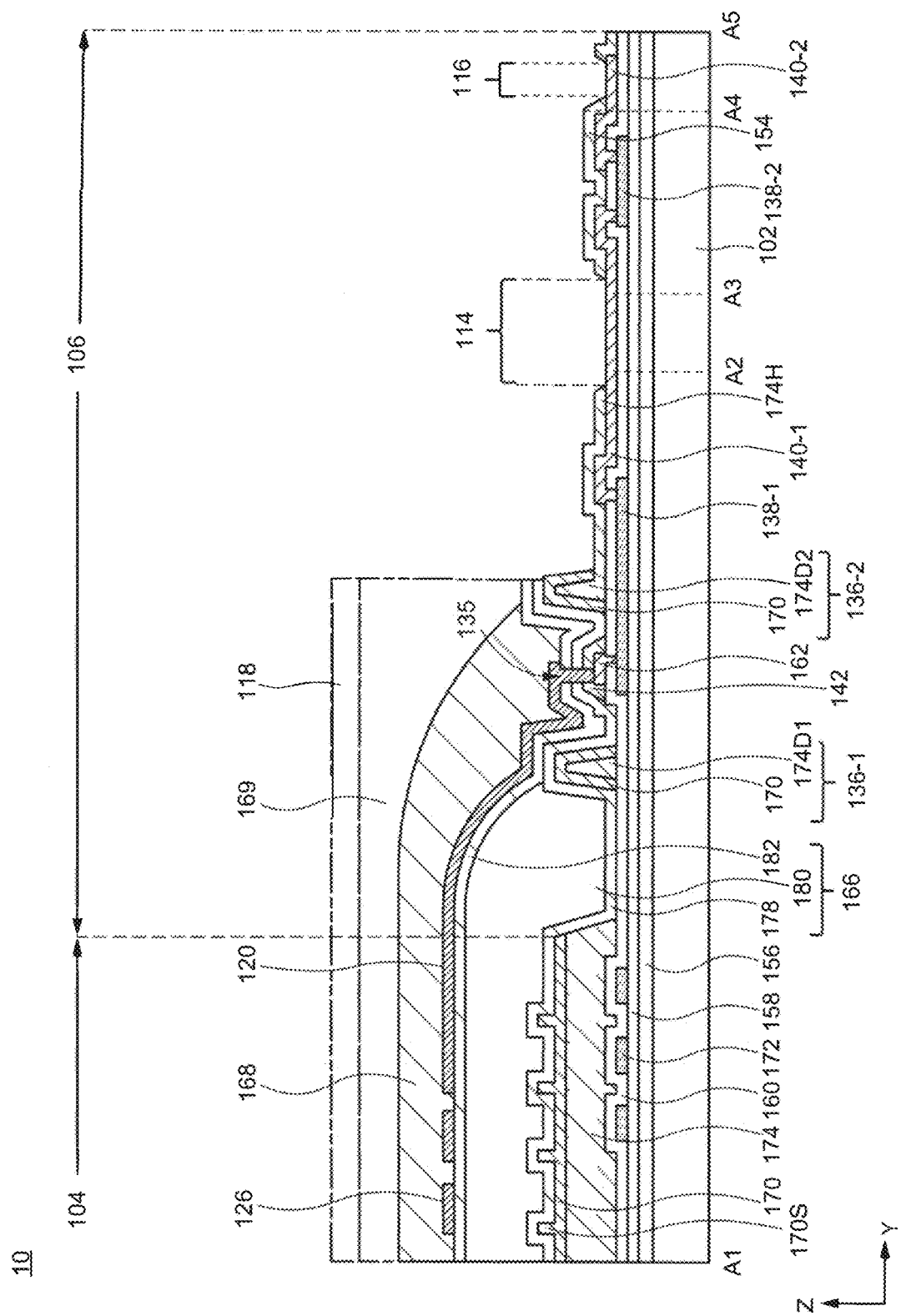

300

320

340

DISPLAY DEVICE

CROSS-REFERENCE TO RELATED APPLICATION

This application claims the benefit of priority to Japanese Patent Application No. 2023-026112 filed on Feb. 22, 2023, the entire contents of which are incorporated herein by reference.

FIELD

An embodiment of the present invention relates to a display device.

BACKGROUND

A display device employing an on-cell type touch sensor is known (see Japanese Laid-Open Patent Publication No. 2019-74709) as one type of display device to which a flexible printed substrate is bonded. An electrode used for the touch sensor is formed on a sealing layer, and a wiring for transmitting a signal from the electrode to the flexible printed substrate is formed on the display device.

Although the sensor electrode of the touch sensor has various shapes, the mesh-like or net-like electrodes surrounding the outline of a sub-pixel can be formed of metal, which is advantageous in terms of resistance reduction. On the other hand, although a sensor electrode is covered with an overcoat layer formed of an organic resin material, the organic resin material cannot be uniformly applied due to steps formed by the mesh-shaped electrode pattern.

SUMMARY

A display device according to an embodiment of the present invention includes at least one pixel including a plurality of sub-pixels, and a linear sensor electrode extending along a boundary of the plurality of sub-pixels and surrounding a periphery of the at least one pixel. The sensor electrode has at least one cut-off portion at the boundary of the plurality of sub-pixels.

BRIEF DESCRIPTION OF DRAWINGS

FIG. 4 is a schematic end view of a display device according to an embodiment of the present invention.

DESCRIPTION OF EMBODIMENTS

Figure 1:
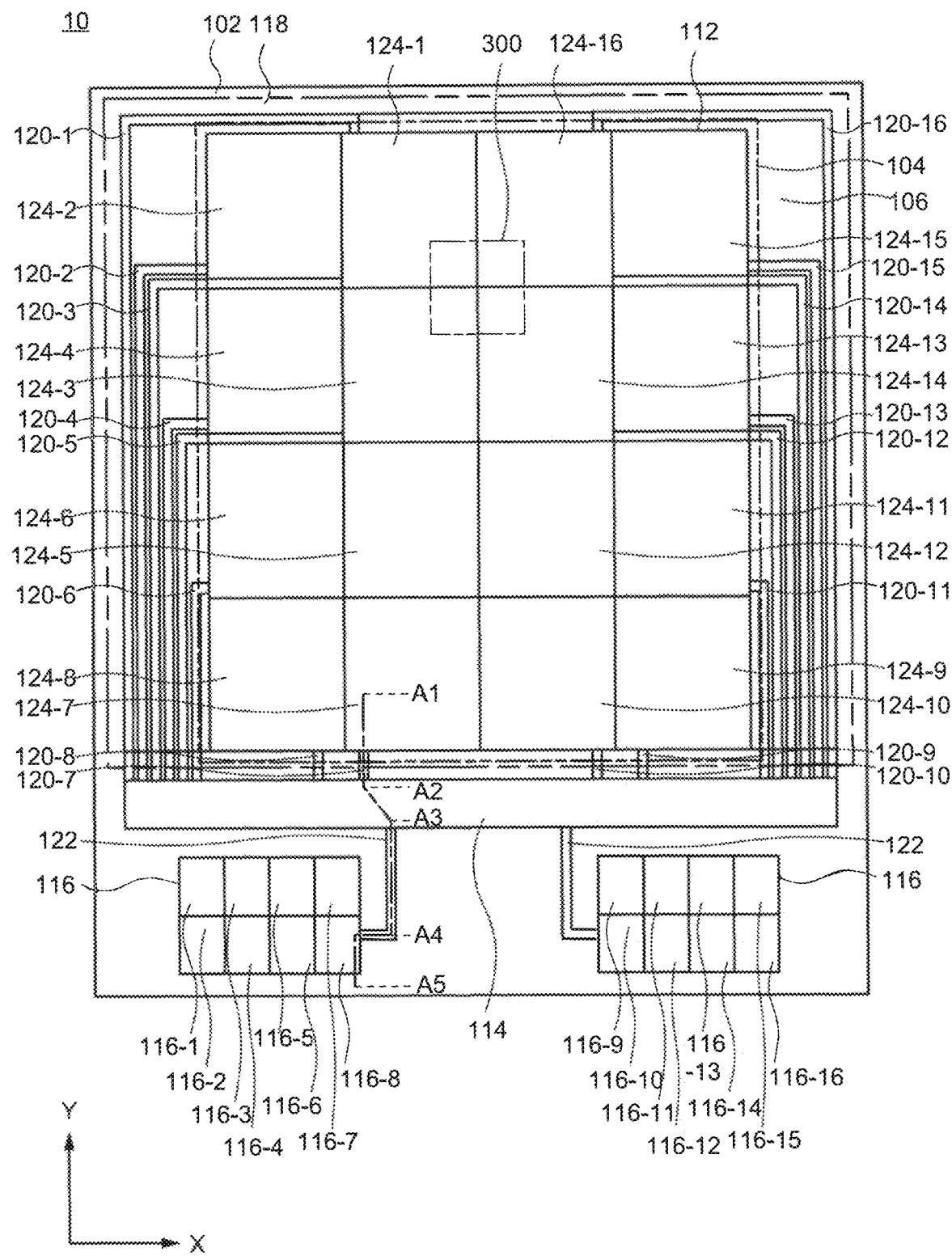
FIG. 1 is a schematic diagram of a configuration of a display device according to an embodiment of the present invention.

Hereinafter, embodiments of the present invention will be described with reference to the drawings and the like. However, the present invention can be implemented in various aspects without departing from the gist thereof, and is not to be construed as being limited to the description of the embodiments exemplified below.

In the drawings, although widths, thicknesses, shapes, and the like of the respective portions may be schematically represented in comparison with the actual embodiments for clarity of explanation, the drawings are merely examples, and do not limit the interpretation of the present invention. In the present specification and the drawings, elements having the same functions as those described with respect to the drawings described above are denoted by the same reference numerals, and redundant descriptions thereof may be omitted.

In the present specification and claims, the expression "on" in describing an embodiment of placing another structure on a structure, unless otherwise specified, includes both placing another structure directly above a structure and placing another structure on a structure via yet another structure.

As used herein and in the claims, the phrase "a structure is exposed from another structure" means that a portion of a structure is not covered by another structure, and the portion that is not covered by the other structure also includes aspects that are covered by yet another structure.

In the present specification and claims, the term "end view" refers to a vertical cut of an object as viewed from the side. In addition, the end view shall include the view as viewed from the end. The expression planar view indicates when the object is viewed from directly above. Top view or plan view shall contain a diagram of a planar view.

First Embodiment

A configuration of a display device 10 according to an embodiment is shown in the present embodiment. FIG. 1 is a diagram of an arrangement of a display region and a touch sensor of a display device according to the present embodiment.

1. Overall Structure

A display device 10 has a substrate 102 and is arranged with a display region 104, a peripheral region 106, a plurality of pixels 108, a touch sensor 112, a mounting pad 114, a test pad 116, and a counter substrate 118 on the substrate 102.

The display device 10 includes the display region 104 and the peripheral region 106 surrounding it. A plurality of pixels for performing display are arranged in the display region 104. The touch sensor 112 is superimposed on the display region 104. The peripheral region 106 is arranged with the mounting pad 114, the test pad 116, a sensor wiring 120 that connects a sensor electrode of the touch sensor, and another wiring 122. Although omitted in FIG. 1, the display device 10 further includes the counter substrate 118 paired with the substrate 102, as illustrated by the dotted line in FIG. 4, which will be described later, so as to overlap the display region 104 and the peripheral region 106.

1-1. Pixel

Figure 2:
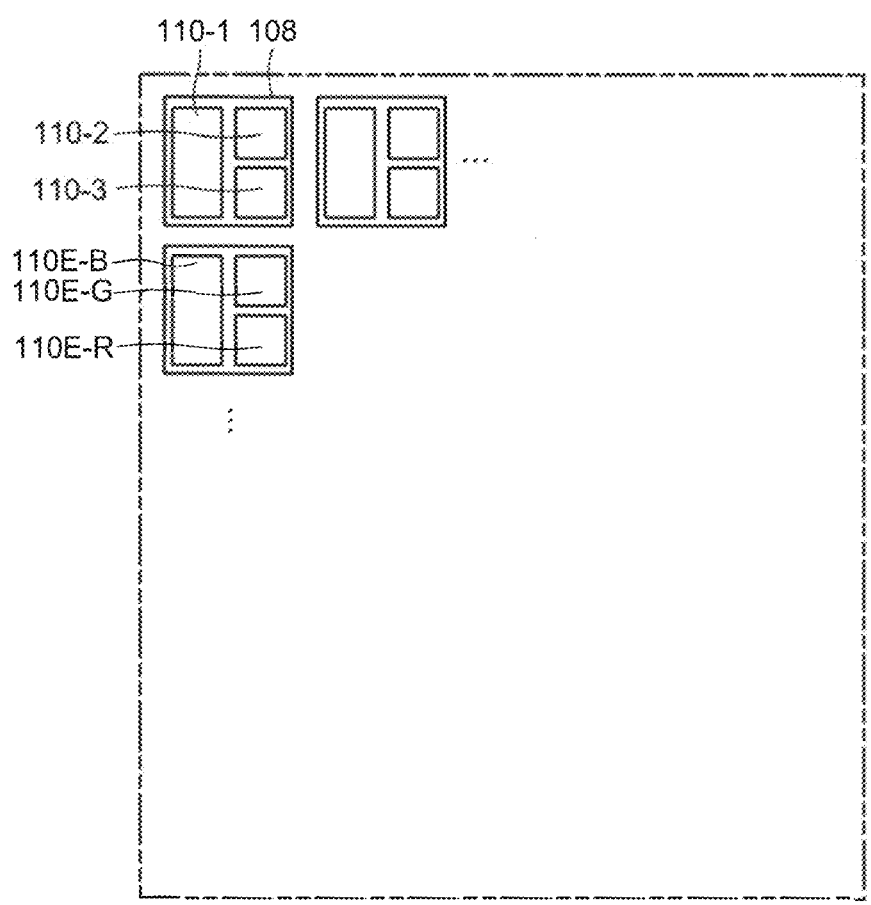
FIG. 2 is a schematic diagram of an arrangement of pixels of a display device according to an embodiment of the present invention.

The display region 104 includes at least one pixel, for example, a plurality of pixels arranged in an X-axis direction and a Y-axis direction. FIG. 2 shows an array of pixels in the display region 104. As illustrated in FIG. 2, the plurality of pixels 108 are arranged in, for example, a row direction (direction X) and a column direction (direction Y) in the display region 104. The pixel 108 includes a plurality of sub-pixels 110. FIG. 2 illustrates an example in which the pixel 108 includes a sub-pixel 110-1, a sub-pixel 110-2, and a sub-pixel 110-3. Each of the sub-pixels corresponds to each color for performing color display, and light-emitting elements 110E having different emission colors are used. For example, a light-emitting element 110E-B that emits blue light is used for the sub-pixel 110-1, a light-emitting element 110E-G that emits green light is used for the sub-pixel 110-2, and a light-emitting element 110E-R that emits red light is used for the sub-pixel 110-3. For example, an organic electroluminescence (Electro Luminescence: EL) device may be used for the light-emitting element 110E.

1-2. Pixel Circuit

Figure 3:
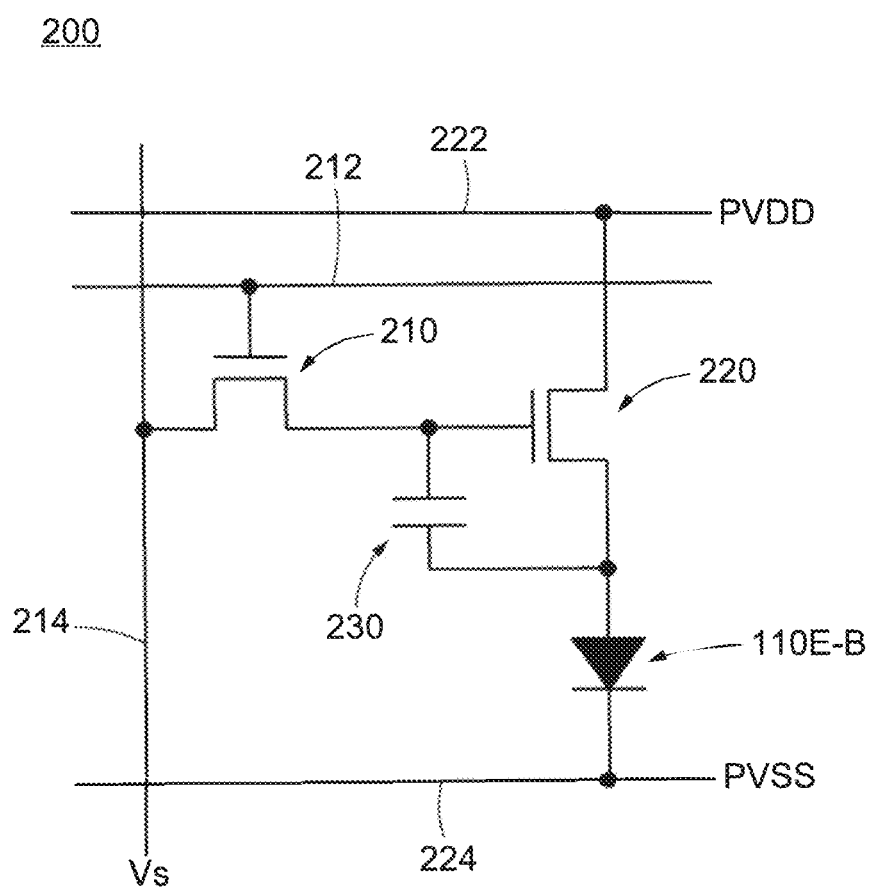
FIG. 3 is a circuit diagram of a pixel of a display device according to an embodiment of the present invention.

A light-emitting element E is electrically connected to transistors arranged in the each of the sub-pixels. FIG. 3 shows a circuit diagram of the sub-pixel 110-1. A pixel circuit 200 of the sub-pixel 110-1 includes a select transistor 210, a drive transistor 220, a capacitor 230, and the light-emitting element 110E-B.

The select transistor 210 is connected to a gate line 212 and a data line 214. Specifically, the gate line 212 is connected to the gate of the select transistor 210. The data line 214 is connected to the source of the select transistor 210. The select transistor 210 functions as a switch for selecting whether a data signal (video signal Vs) is input to the pixel circuit 200. The drain of the select transistor 210 is connected to the gate of the drive transistor 220 and the capacitor 230.

The drive transistor 220 is connected to an anode power line 222, the light-emitting element 110E-B and the capacitor 230. Specifically, the anode power line 222 is connected to the drain of the drive transistor 220. The light-emitting element 110E-B is connected to the source of the drive transistor 220. The capacitor 230 is connected between the gate and the source of the drive transistor 220. The drive transistor 220 controls the current flowing through the light-emitting element 110E-B. A high potential power line (PVDD) is applied to the anode power line 222.

The capacitor 230 holds the data-signal input through the select transistor 210. A voltage corresponding to the data signal held in the capacitor 230 is applied to the gate of the drive transistor 220. As a result, the amount of current flowing through the drive transistor 220 is controlled in accordance with the data signal.

The light-emitting element 110E-B is connected between the drive transistor 220 and a cathode power line 224. Specifically, the light-emitting element 110E-B is connected to the source of the drive transistor 220. That is, the anode of the light-emitting element 110E-B is connected to the anode power line 222 via the drive transistor 220. The cathode of the light-emitting element 110E-B is connected to the cathode power line 224. A low potential power source (PVSS) is applied to the cathode power line 224.

When the select transistor 210 is turned on in the pixel circuit 200, a data signal is input from the data line 214. A voltage corresponding to the input data signal is held by the capacitor 230. Thereafter, in the light emission period, the gate of the drive transistor 220 is controlled by the voltage held by the capacitor 230, and a current corresponding to the data signal flows through the drive transistor 220. When a current flows through the light-emitting element 110E, the light-emitting element 110E-B emits light with a luminance corresponding to the amount of current.

The signal supplied to the pixel circuit 200 may be electrically connected to and supplied to a driving circuit external to the substrate 102 or a driving circuit arranged in the peripheral region 106. A driving IC (Integrated Circuit) can be used as the external driving circuit.

The driving IC can be mounted on the substrate 102 by, for example, COF (Chip On Film using anisotropic conductive films (ACF: Anisotropic Conductive Film)). For example, the driving IC may be mounted via the mounting pad 114 arranged in the peripheral region 106, for example, using FOG (Film On Glass) in which a wiring substrate is mounted using an anisotropic conductive film.

1-3. Touch Sensor 1-3-1. Sensor Block

The touch sensor 112 is arranged to overlap the plurality of pixels 108 in the display region 104. The touch sensor 112 may be partitioned into a plurality of sensor blocks 124. The plurality of sensor blocks 124 may be arranged in a first direction and a second direction intersecting the first direction in the display region 104. In the plurality of sensor blocks 124, a plurality of the sensor electrodes 126 constituting the touch sensor 112 are respectively arranged. The sensor block 124 overlaps the plurality of pixels 108. In the example shown in FIG. 1, a plurality of sensor blocks 124-1 to 124-16 are arranged in the row direction (direction X) and the column direction (direction Y) in the display region 104, and sensor electrodes 126, which will be described later, are arranged in the sensor block 124-1 to the sensor block 124-16.

Figure 5A:
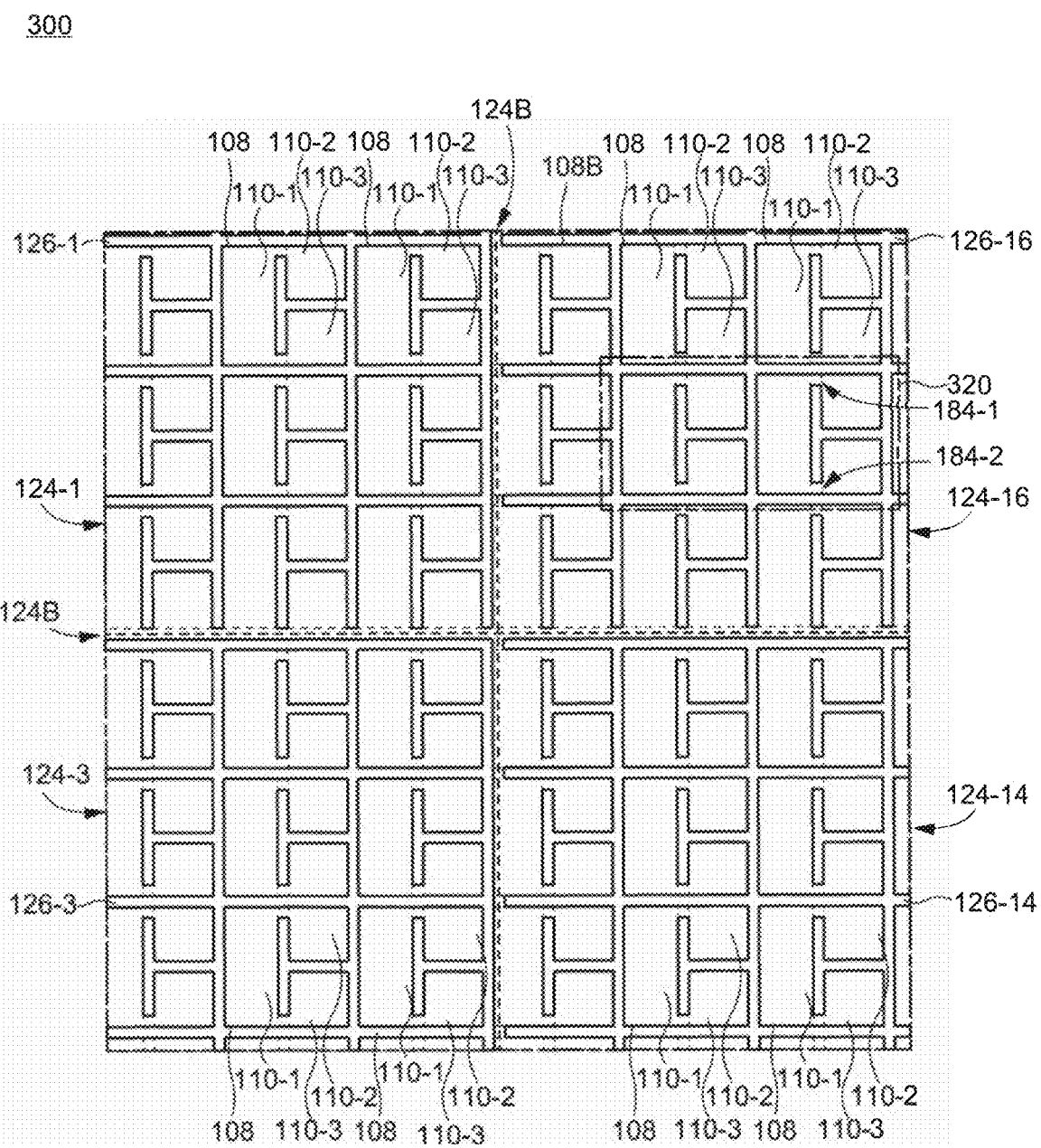
FIG. 5A is a schematic diagram of an arrangement of sensor electrodes of a display device according to an embodiment of the present invention.

The sensor electrode 126 is connected to the different sensor wiring 120 for each of the sensor blocks 124. For example, as shown in FIG. 5A shown below, the sensor electrode 126-1 arranged in the sensor block 124-1 is directly or electrically connected to the sensor wiring 120-1, and a sensor electrode 126-3 arranged in the sensor block 124-3 adjacent to the sensor block 124-1 is directly or electrically connected to the sensor wiring 120-3. Further, for example, the sensor electrode 126-16 arranged in the sensor block 124-16 adjacent to the sensor block 124-1 is directly or electrically connected to the sensor wiring 120-16, and the sensor electrode 126-14 arranged in the sensor block 124-14 adjacent to the sensor block 124-16 or the sensor block 124-3 is directly or electrically connected to the sensor wiring 120-14.

The sensor wiring 120 connects to the sensor electrode 126 at the display region 104, is drawn around the peripheral region 106, and connects to the mounting pad 114. The connection between the sensor wiring 120 and the mounting pad 114 may be an electric connection via a plurality of wiring or contact pads. The mounting pad 114 is electrically connected to the external driving circuit and can provide a signal from the external driving circuit to the sensor wiring 120.

A driving circuit for driving the sensor electrode 126 can be a driving IC, the same as the external driving circuit of the pixel 108. The sensor electrode 126 is electrically connected to the driving IC via the mounting pad 114 which is electrically connected to the sensor wiring 120. The above-described FOG or COF can be used for the mounting pad 114 and the driving IC. The mounting pad 114 is connected to the test pad 116 used to test the sensor electrode 126. The mounting pad 114 and the test pad 116 may be electrically connected via a plurality of wiring.

1-3-2. Cross-Sectional Structure

Referring now to FIG. 4, the structure of the display area 104 including the touch sensor 112 and the peripheral area 106 in the end view is explained. A schematic cross-sectional view of an embodiment of the present invention taken along a chain line A1-A5 is shown in FIG. 1. Hereinafter, the same configurations as those in FIG. 1 to FIG. 3 will be omitted in some cases.

The display device 10 includes the substrate 102, and the substrate 102 may be made of, for example, a glass/quartz substrate, or an organic resin substrate. When an organic resin substrate is used, the substrate 102 may have flexibility.

A base film 156 may be arranged above the substrate 102. The base film 156 can prevent contamination from the substrate 102, and can be made of an inorganic insulating material, for example. For example, silicon nitride, silicon oxide, and composites thereof can be used as the inorganic insulating material.

An insulating film 158 may be arranged above the base film 156. The insulating film 158 in the display region 104 may have a function of a gate insulating film of transistors arranged in a driving circuit which are included in the pixel 108 and peripheral region. The insulating film 158 may be made of the same material as that of the base film 156.

Above the insulating film 158, a signal line 172 may be arranged in the display region 104, and a wiring 138-1 and a wiring 138-2 may be arranged in the peripheral region 106. The signals supplied from the driving circuit or the external driving circuit in the peripheral region 106 described above to the respective pixels 108 are transmitted through the signal line 172. Alternatively, the signal line 172 may function as a power line that supplies a constant potential to each of the pixels 108. The wiring 138-1 is located between the sensor wiring 120 and the mounting pad 114, and can electrically connect the sensor electrode 126 and a terminal wiring 140-1. The wiring 138-2 may be located between the mounting pad 114 and the test pad 116 to configure the wiring 122 shown in FIG. 1. The wiring 138-2 may electrically connect the mounting pad 114 and the test pad 116. For example, a material containing titanium, aluminum, copper, molybdenum, or the like as a main component can be used for the signal line 172 and the wiring 138, and those materials can be used as a single layer or a stacked layer.

An interlayer film 160 may be arranged over the signal line 172, the wiring 138-1, the wiring 138-2, and the insulating film 158 to cover the signal line 172, the wiring 138-1, and the wiring 138-2. The interlayer film 160 may also function as a planarization film of the signal line 172. The interlayer film 160 may be made of the same material as that of the base film 156.

A contact pad 162, the terminal wiring 140-1, and the terminal wiring 140-2 may be arranged on the interlayer film 160. The contact pad 162 is located on the wiring 138-1 and is arranged between the sensor wiring 120 and the wiring 138-1. The contact pad 162 can be used to connect the sensor wiring 120 to the wiring 138-1. The terminal wiring 140-1 is located between the sensor wiring 120 and the mounting pad 114 and functions by exposing it from a planarization layer 174H as the mounting pad 114. The terminal wiring 140-1 may function as a wiring that transmits a signal between the external driving circuit and the touch sensor 112 shown in FIG. 1. The terminal wiring 140-2 may be located between the wiring 138-2 and the test-pad 116 to configure the wiring 122 shown in FIG. 1. The terminal wiring 140-2 functions as the test pad 116 by being exposed from the planarization layer 174H. The terminal wiring 140-1 and the terminal wiring 140-2 can have a single layer or stacked structure. For example, a three-layer structure of titanium (Ti), aluminum (Al), titanium (Ti), a five-layer structure of molybdenum tungsten (MoW), Ti, Al, Ti, ITO (Indium Tin Oxide), and a four-layer structure of Mo, Al, Mo, ITO can be used for the terminal wiring 140-1 and the terminal wiring 140-2.

An insulating layer 142 may be arranged above the contact pad 162. The insulating layer 142 is located between a step portion 136-1 and a step portion 136-2. The insulating layer 142 covers an end portion of the contact pad 162. The insulating layer 142 can be formed in the same manner as the planarization layer 174H described later, and can be made of the same material as the planarization layer 174H.

The planarization layer 174 may be arranged above the interlayer film 160 and the signal line 172, in the display region 104. Further, the step portion 136-1 and the step portion 136-2 are arranged above the interlayer film 160 in the peripheral region 106. The step portion 136-1 and the step portion 136-2 are arranged between the pixel 108 located in the display region 104 and the mounting pad 114 located in the peripheral region 106. The step portion 136-1 is arranged between the pixel 108 and the step portion 136-2. The step portion 136-2 is arranged overlapping the wiring 138-1 on the interlayer film 160. The step portion 136-2 is arranged between the step portion 136-1 and the mounting pad 114.

The step portion 136-1 is arranged so as to surround the display region 104. The step portion 136-1 may be formed of a stacked structure. The step portion 136-1 configures, for example, a stacked structure of a planarization layer 174D1 and an insulating film 170 as shown in FIG. 4. The thickness of the step portion 136-1 or the height in the end view is the sum of the thickness of the planarization layer 174D1 and the thickness of the insulating film 170. The planarization layer 174D1 in the step portion 136-1 can be formed by removing the planarization layer 174 along the periphery of the display region 104. In addition, the planarization layer 174D1 formed by this elimination forms a step on the substrate 102. The insulating film 170 is stacked on the planarization layer 174D1 on which the step is formed, and the step portion 136-1 is formed. As described above, the step portion 136-1 in which the sum of the stacked films is the film thickness or the height is a structure higher than that of the other structures on the substrate 102. Therefore, the step portion 136-1 can maintain a first organic insulating layer 180 covering the display region 104 described later in the display region 104

The step portion 136-2 is arranged to surround the step portion 136-1. The step portion 136-2 can be formed in the same manner as the step portion 136-1. For example, as shown in FIG. 4, the step portion 136-2 can be formed by laminating the planarization layers 174D2 and the insulating film 170. The planarization layer 174D2 may be formed by the planarization layer 174. In addition, the planarization layer 174D2 formed along the periphery of the planarization layer 174 forms a step on the substrate 102. The insulating film 170 is stacked on the planarization layer 174D1 on which the step is formed, and the step portion 136-2 is formed. By forming the step portion 136-2 in this manner, an overcoat layer 168 can be maintained in the step portion 136-2. Accordingly, since the mounting pad 114 is not covered with the overcoat layer 168, it can be smoothly connected to a driving IC such as a COF without removing the overcoat layer 168.

Further, the planarization layer 174H contiguous with the step 136-2 may be arranged on the wiring 138. The planarization layer 174H can be formed simultaneously with the step portion 136-2. For example, among the films forming the step portion 136-2, the planarization layer 174 is arranged above the terminal wiring 140-1, a full-tone mask is arranged on the planarization layer 174 corresponding to the step portion 136-2, a halftone mask is arranged from an end portion of the planarization layer 174 to the terminal wiring 140-1, exposure is performed, and development and baking are performed, whereby the planarization layer 174H can be formed. A halftone mask is a photomask having a non-uniform light transmittance and a low light transmittance compared to a full-tone mask.

In this case, the terminal wiring 140-1 arranged below the planarization layer 174H has a portion exposed from the planarization layer, and the portion can be used as the mounting pad 114, as described above. In addition, the terminal wiring 140-2 arranged below the planarization layer 174H also has a portion exposed from the planarization layer 174H, and the portion may be used as the test pad 116, as described above.

The same materials can be used for the terminal wiring 140-1 and the terminal wiring 140-2 as the material used for the signal line 172 and the wiring 138. In addition, a photosensitive organic resin material including an acryl resin, a polysiloxane, a polyimide, a polyester, or the like can be used for the planarization layer 174 and the insulating film 170, and can function as an organic insulating layer. Further, an insulating layer 113 and an insulating layer 115 may be made of a photosensitive organic resin material including an epoxy-resin, an acrylic-resin, or the like.

In addition, the insulating film 170 may be arranged over the planarization layer 174. Although the geometry of the insulating film 170 is not shown in detail in FIG. 4, the insulating film 170 may have a construction including the functions of a barrier layer and a spacer 170S. The barrier layer may have a function of defining the pixel 108, and the spacer 170S may have a function of supporting a fine mask used in a manufacturing process of the light-emitting element 110E of the pixel 108, for example, a vapor deposition process. The barrier layer is arranged so as to cover end portions of the light-emitting element 110E electrodes arranged in the pixel 108. The spacer 170S may be arranged on the barrier layer.

The barrier layer and the spacer 170S may be formed from the insulating film 170. For example, a resin film may be formed on the planarization layer 174 and a SPC mask including a full-tone mask and a half-tone mask may be used to create the thick spacer 170S and the thin barrier layer from the insulating film 170. An organic resin material such as an epoxy resin or an acrylic resin used in the insulating film 170 can be used as the spacer 170S and the barrier layer.

A sealing layer 166 is arranged above the insulating film 170 and in a region surrounded by the step portion 136-1 and the step portion 136-2 in a plan view. The sealing layer 166 includes a plurality of insulating layers, and may be arranged with different functions. For example, the sealing layer 166 includes a first inorganic insulating layer 178, the first organic insulating layer 180, and a second inorganic insulating layer 182, as shown in FIG. 4.

The region surrounded by the step portion 136-1 and the step portion 136-2 includes the display region 104, and when the organic EL element is used for the pixel 108, the first inorganic insulating layer 178 covers the organic EL element, thereby suppressing entry of impurities into the display region. For example, an inorganic compound such as silicon oxide or silicon nitride can be used as the first inorganic insulating layer 178.

The first organic insulating layer 180 is arranged in a region above the first inorganic insulating layer 178 and surrounded by the step portion 136-1 in a plan view. The first organic insulating layer 180 is arranged along the step portion 136-1 so as not to exceed the planarization layer 174 or the step portion 136-1. In addition, the first organic insulating layer 180 may be planarized over the pixel 108 and may protect the light-emitting element 110E from contaminants if the pixel 108 is arranged with the light-emitting element 110E. The first organic insulating layer 180 may be made of the same material as that of the insulating film 170.

The second inorganic insulating layer 182 may be arranged above the first organic insulating layer 180 and in a region surrounded by the step portion 136-1 and the step portion 136-2 in a plan view. The second inorganic insulating layer 182 contacts the first inorganic insulating layer 178 in a region outside the first organic insulating layer. As a result, the first inorganic insulating layer 178 and the second inorganic insulating layer 182 cover the step portion 136-1 and extend outward of the step portion 136-1. With such a configuration, the first inorganic insulating layer 178 and the second inorganic insulating layer 182 can seal the first organic insulating layer 180. For example, an inorganic compound such as silicon nitride can be used as the second inorganic insulating layer 182.

A plurality of different types of films, such as the first organic insulating layer 180 and the second inorganic insulating layer 182 described above, can planarize over the pixel 108 and protect the light-emitting element 110E arranged on the pixel 108 from contaminants, so that in the display region 104, a structure, such as the touch sensor 112, can be arranged above the pixel 108.

The sensor electrode 126 may be arranged above the second inorganic insulating layer 182, in the display region 104. The sensor electrode 126 may be formed using a metallic material. Examples of the metallic material include a metal of molybdenum and aluminum (a zero-valent metal). The sensor electrode 126 may use a stacked structure, for example, the structure stacked with Ti, Al, and Ti, or Mo, Al, and Mo can be used.

In addition, the sensor wiring 120 which connects to the sensor electrode 126 is arranged above the sealing layer 166. Specifically, the sensor wiring 120 is arranged on the second inorganic insulating layer 182 of sealing layer 166. The sensor wiring 120 rides over the step portion 136-1 and extends to the contact pad 162 for connecting to the wiring 138-1 via the contact pad 162 located between the step portion 136-1 and the step portion 136-2. The sensor wiring 120 may be made of the same material as the sensor electrode 126.

In addition, the overcoat layer 168 is arranged above the sensor electrode 126 and the sensor wiring 120 to cover them. In addition, the overcoat layer 168 is arranged so as to extend over a contact hole 135. The overcoat layer 168 is arranged in the region surrounded by the step portion 136-2 in a plan view. The overcoat layer 168 may be formed of the same material as that of the first organic insulating layer 180.

The counter substrate 118 may be arranged above the overcoat layer 168. Although the example in which the counter substrate 118 is arranged so as to overlap the overcoat layer 168 is shown in FIG. 4, it may be arranged on a construction arranged on the substrate 102. A film, a glass, or the like having a polarization plate function can be used as the counter substrate 118. In addition, the counter substrate 118 has a function of protecting the structure arranged on the substrate 102, for example, the pixel 108, the touch sensor 112, and the like. Further, when the counter substrate 118 and the substrate 102 are bonded together, they can be bonded together between the counter substrate 118 and the substrate 102 using an adhesive layer 169. An adhesive may be used for the adhesive layer 169. The adhesive may be an adhesive having a refractive index close to that of the counter substrate 118 such as OCA (Optical Clear Adhesive). Such adhesives can be fabricated in the face of a construction on the substrate 102 to be bonded between the counter substrate 118 and the substrate 102 using the adhesive layer 169.

1-3-3. Sensor Electrode

The sensor electrode 126 used in the touch sensor 112 will be described with reference to FIG. 5A. FIG. 5A is a schematic diagram showing an arrangement of sensor electrodes of a display device according to an embodiment of the present invention, which is a portion 300 surrounded by a broken line shown in FIG. 1, and is an enlarged view of the plurality of sensor block 124-1, sensor block 124-3, sensor block 124-14, and sensor block 124-16.

The sensor electrode 126 is linear and is formed by successive linear patterning. The sensor electrode 126 preferably includes a pattern that is contiguous and is not electrically floating within the sensor block 124. The sensor electrode 126-1 is arranged in the sensor block 124-1 and is contiguous within the sensor block 124-1, in the example shown in FIG. 5A. The linear sensor electrode 126-3 is arranged in the sensor block 124-3 and is contiguous within the sensor block 124-3. The sensor electrode 126-16 is arranged in the sensor block 124-16 and is contiguous within the sensor block 124-16. The sensor electrode 126-14 is arranged in the sensor block 124-14 and is contiguous within the sensor block 124-14.

The sensor electrodes 126 arranged in the different sensor blocks 124 are spaced apart from each other and are not connected to each other. In the embodiment shown in FIG. 5A, the sensor electrode 126-1, the sensor electrode 126-3, the sensor electrode 126-14, and the sensor electrode 126-16 arranged in each of the sensor block 124-1, the sensor block 124-3, the sensor block 124-14, and sensor block 124-16 are spaced apart from each other and are not contiguous. The sensor electrode 126-1 and the sensor electrode 126-3 arranged in the neighboring sensor block 124-1 and the sensor block 124-3 are spaced apart from each other between the sensor block 124-1 and the sensor block 124-3. The sensor electrode 126-1 and the sensor electrode 126-16 arranged in the neighboring sensor block 124-1 and the sensor block 124-16 are spaced apart from each other between the sensor block 124-1 and the sensor block 124-16. The sensor electrode 126-3 and the sensor electrode 126-14 arranged in the neighboring sensor block 124-3 and the sensor block 124-14 are spaced apart from each other between the sensor block 124-3 and the sensor block 124-14. The sensor electrode 126-16 and the sensor electrode 126-14 arranged in the neighboring sensor block 124-16 and the sensor block 124-14 are spaced apart between the sensor block 124-16 and the sensor block 124-14.

The sensor electrode 126, along with the sensor electrode 126 arranged in the other sensor blocks 124 that are spaced apart from each other, may surround a periphery of the pixel 108 that faces boundaries of the sensor blocks 124. A plurality of pixels 108B faces a boundary 124B between the sensor block 124-1 and the sensor block 124-16, in the example shown in FIG. 5A. The periphery of the plurality of pixels 108B is surrounded by the sensor block 124-1 and the sensor electrode 126 arranged in the sensor block 124-16. In this case, the sensor electrode 126 arranged in the sensor block 124-16 has an end portion toward the sensor block 124-1. The sensor electrode 126-1 arranged in the sensor block 124-1 has a section which is contiguous to the sensor block 124-16. The pixel 108B facing the boundaries of the sensor blocks 124 are not surrounded by successive sensor electrodes 126, so that the sensor electrode 126 between the sensor blocks 124 are spaced apart from each other.

The sensor electrode 126 may be arranged such that the position of a cut-off portion 184 in the pixel 108 is repeatedly arranged at the same position in the plurality of pixels 108. In the embodiment shown in 5A, the positions of the cut-off portion 184-1 and the cut-off portion 184-2 in the pixel 108 are repeated in the plurality of sensor blocks 124.

Figure 5B:
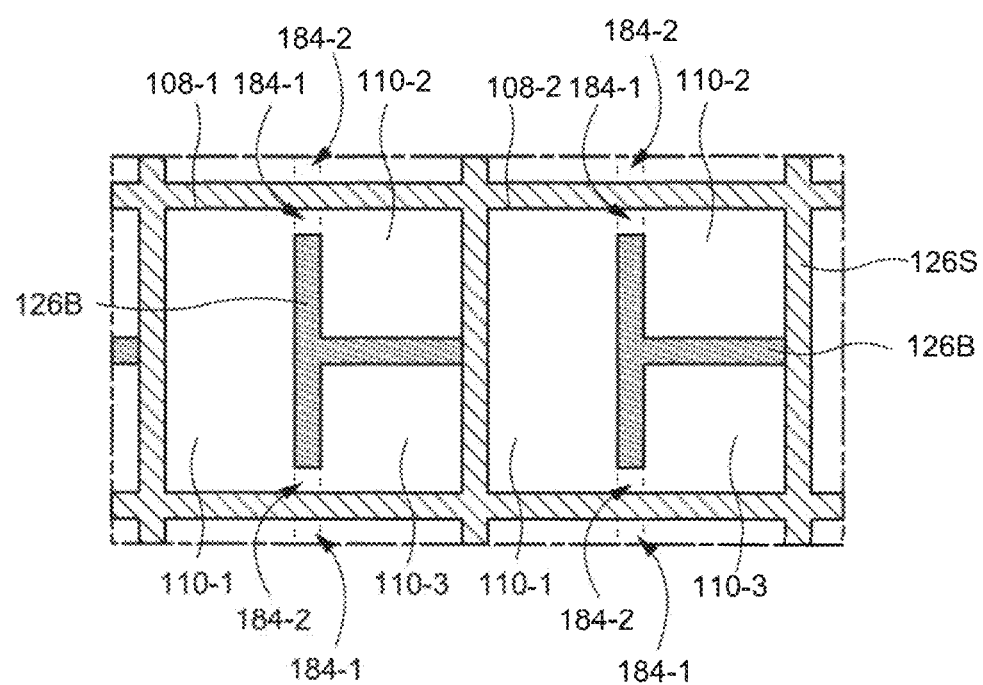
FIG. 5B is a schematic diagram of a configuration of sensor electrodes of a display device according to an embodiment of the present invention.

Next, the configuration of the sensor electrode 126 will be described with reference to FIG. 5B. FIG. 5B is a diagram schematically showing a configuration of sensor electrodes of a display device according to an embodiment of the present invention. FIG. 5B shows an enlarged view of a portion 320 surrounded by a broken line shown in FIG. 5A.

The sensor electrode 126 is formed in a linear thin pattern and surrounds the periphery of the at least one pixel 108. The sensor electrode 126 extends along the boundary of the plurality of pixels 108 at the sensor block 124. The sensor electrode 126 further extends along the boundary of the plurality of sub-pixels 110. The sensor electrode 126 includes a sensor electrode 126S extending along a boundary of the plurality of sub-pixels 110 and a sensor electrode 126B extending along a boundary of the plurality of sub-pixels 110. The sensor electrode 126S and the sensor electrode 126B are connected and contiguous at least in part.

The sensor electrode 126S surrounds the periphery of the pixel 108 and extends along the boundary between a pixel 108-1 and a pixel 108-2, in the example shown in FIG. 5B. The sensor electrode 126B extends along the boundaries of the sub-pixel 110-1, the sub-pixel 110-2, and the sub-pixel 110-3. The sensor electrode 126 is composed of the sensor electrode 126S and the sensor electrode 126B, and the sensor electrode 126S and the sensor electrode 126B are partially connected to each of the pixels 108 and are contiguous with each other.

The sensor electrode 126 is arranged so as to overlap the plurality of the pixels 108, but surrounds the periphery of the pixels 108 and is arranged along the boundary of the sub-pixel 110, so that the presence or absence of a touch can be sensed by the touch sensor 112 while displaying images such as icons on the pixels 108.

The sensor electrode 126 has at least one cut-off portion 184 at the boundary of the plurality of sub-pixels 110. At least one cut-off portion 184 is located at the boundary of adjacent sub-pixels 110. The cut-off portion 184 is preferably located along the inner edge of the sensor electrode 126 surrounding the periphery of the pixel 108. The cut-off portion 184 is preferably located at a boundary between the sensor electrode 126S and the sensor electrode 126B. The sub-pixel 110-1 and the sub-pixel 110-2 are adjacent to each other in the example shown in FIG. 5A and FIG. 5B, and the sensor electrode 126 has a cut-off portion 184-1 at a boundary between the sub-pixel 110-1 and the sub-pixel 110-2. The cut-off portion 184-1 is located along the inner edge of the sensor electrode 126S surrounding the periphery of the pixel 108. The cut-off portion 184-1 is located at the boundary between the sensor electrode 126S and the sensor electrode 126B.

The at least one cut-off portion 184 may include a plurality of cut-off portions 184. The sensor electrode 126 may include the plurality of cut-off portions 184 in addition to the cut-off portion 184-1 described above. The sensor electrode 126 may have the cut-off portion 184 along respective boundaries of the plurality of sub-pixels 110.

In the embodiment shown in FIG. 5B, the pixel 108 includes three sub-pixels as the sub-pixel 110-1, the sub-pixel 110-2, and the sub-pixel 110-3. The sub-pixel 110-1 having an area larger than areas of the sub-pixel 110-2 and the sub-pixel 110-3 is adjacent to the sub-pixel 110-2 and the sub-pixel 110-3, further the sub-pixel 110-2 and the sub-pixel 110-3 are adjacent to each other. As described above, the sensor wiring 120 includes the cut-off portion 184-1 at the boundary between the sub-pixel 110-1 and the sub-pixel-2. The sensor electrode 126 further includes a cut-off portion 184-2 at a boundary between the sub-pixel 110-1 and the sub-pixel 110-3. The cut-off portion 184-2 is located along the inner edge of the sensor electrode 126 surrounding the periphery of the pixel 108 in the same manner as the cut-off portion 184-1. The cut-off portion 184-2 is located at the interface between the sensor electrode 126S and the sensor electrode 126B. The positions of the cut-off portion 184-1 and the cut-off portion 184-2 are in the same direction in the sub-pixel 110-2 and the sub-pixel 110-3 as viewed from the sub-pixel 110-1.

In the display device 10, the sensor electrode 126 surrounds the periphery of the pixel 108, extends along the boundary of the plurality of sub-pixels 110, and has at least one cut-off portion 184-1 at the boundary of the plurality of sub-pixels 110, so that the overcoat layer 168 arranged on the sensor electrode 126 easily flows into a region surrounded by the sensor electrode 126. The overcoat layer 168 may sufficiently cover the sensor electrode 126 by the flow of the overcoat layer 168, and may improve the coverage of the overcoat layer 168 with respect to the sensor electrode 126. Therefore, by applying the present embodiment, it is possible to provide a display device with good appearance and improved reliability.

Furthermore, in the display device 10, the position of the cut-off portion 184 does not differ for each pixel 108, and is repeatedly arranged at the same position, so that the appearance of the display device 10 becomes uniform. In addition, arranging the cut-off portion 184 between the sub-pixel 110 having a large area and the sub-pixel 110 having a small area in the plurality of sub-pixels 110 having different areas further improves the covering condition of the overcoat layer 168 with respect to the sensor electrode 126, and the visual property in the up-down direction (direction X) becomes better. Therefore, by applying the present embodiment, it is possible to provide a display device with good appearance and improved reliability.

2. Modifications 2-1. First Modification

Figure 6A:
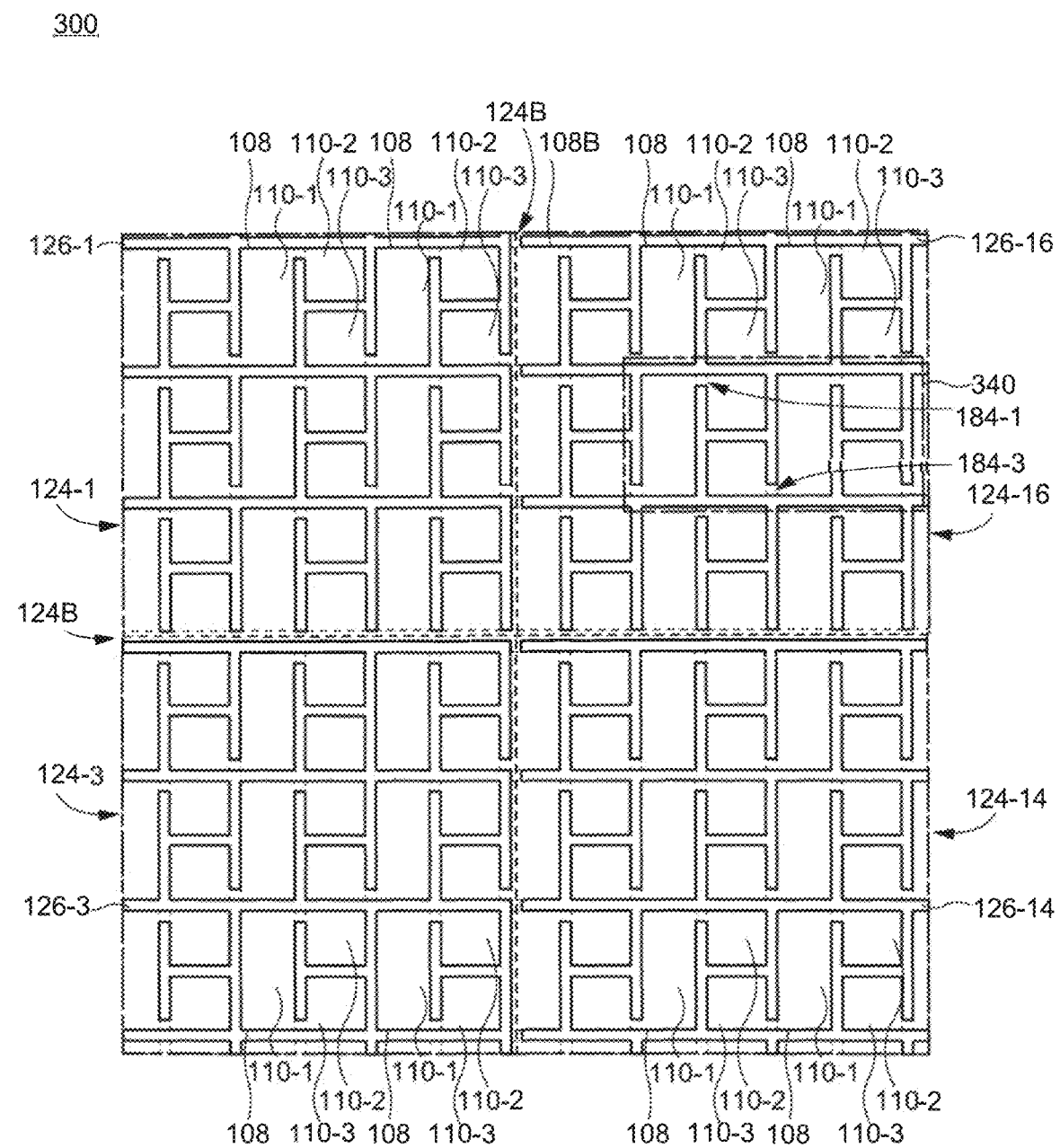
FIG. 6A is a schematic diagram of an arrangement of sensor electrodes of a display device according to an embodiment of the present invention.
Figure 6B:
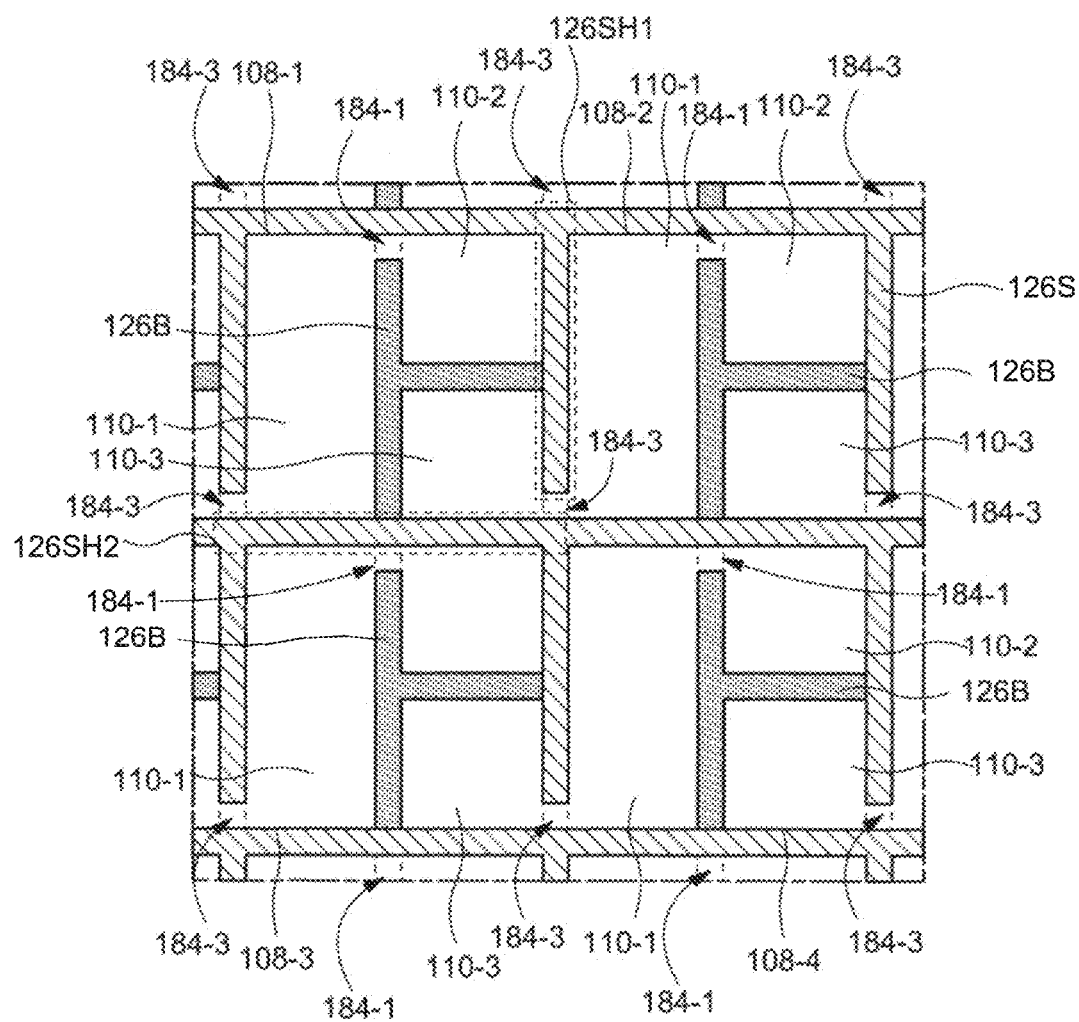
FIG. 6B is a schematic top view of a display device according to an embodiment of the present invention.

The configuration of the display device 10 is not limited to the structure described above. For example, as shown in FIG. 6A, a cut-off portion 184-3 may be arranged in the sensor electrode 126 surrounding the periphery of the pixel 108. FIG. 6A is a diagram schematically showing an arrangement of sensor electrodes of a display device according to an embodiment of the present invention, and is an enlarged view of the sensor electrode 126 arranged in the plurality of sensor blocks 124 as in FIG. 5A. FIG. 6B shows an enlarged view of the sensor electrode 126 that is surrounded by a broken line 340 shown in FIG. 6A and that surrounds the plurality of pixels 108.

In addition to the cut-off portion 184-1 between the sub-pixel 110-1 and the sub-pixel 110-2, the cut-off portion 184-3 may be further arranged in the sensor electrode 126S surrounding the pixel 108. The cut-off portion 184-3 may cut the sensor electrode 126S surrounding the periphery of the pixel 108. The cut-off portion 184-3 may be arranged between adjacent pixels 108. The cut-off portion 184-3 may be arranged between the adjacent pixels 108 at a position close to the adjacent pixel 108 different from the above-described adjacent pixel 108. The cut-off portion 184-3 may be located at the boundary of a distinct sensor electrode 126 that shares with neighboring pixels 108. The cut-off portion 184-3 is located between the sub-pixel 110-3 and the sub-pixel 110-1 of the adjacent pixel 108. The cut-off portion 184-3 may be located between the sub-pixel 110-3 of the pixel 108-1, the pixel 108-1, and the sub-pixel 110-1 of the adjacent pixel 108-2.

In the embodiment shown in FIG. 6A and FIG. 6B, the cut-off portion 184-3 is arranged in the sensor electrode 126 between the pixel 108-1 and the pixel 108-2. The cut-off portion 184-3 is arranged between the adjacent pixel 108-2 and at a position close to the adjacent pixel 108-3. The sensor electrode 126S surrounding the periphery of the pixel 108-1 has a shared unit 126SH-1 that is shared with the sensor electrode 126S surrounding the periphery of the adjacent pixel 108-2, and has a shared unit 126SH-2 that is shared with the sensor electrode 126S surrounding the periphery of the adjacent pixel 108-3. The cut-off portion 184-3 is located at a boundary between the shared unit 126SH-1 and the shared unit 126SH-2. The cut-off portion 184-3 is located between the sub-pixel 110-3 of the pixel 108-1 and the sub-pixel 110-1 of the adjacent pixel 108-2.

2-2. Second Modification

Figure 7:
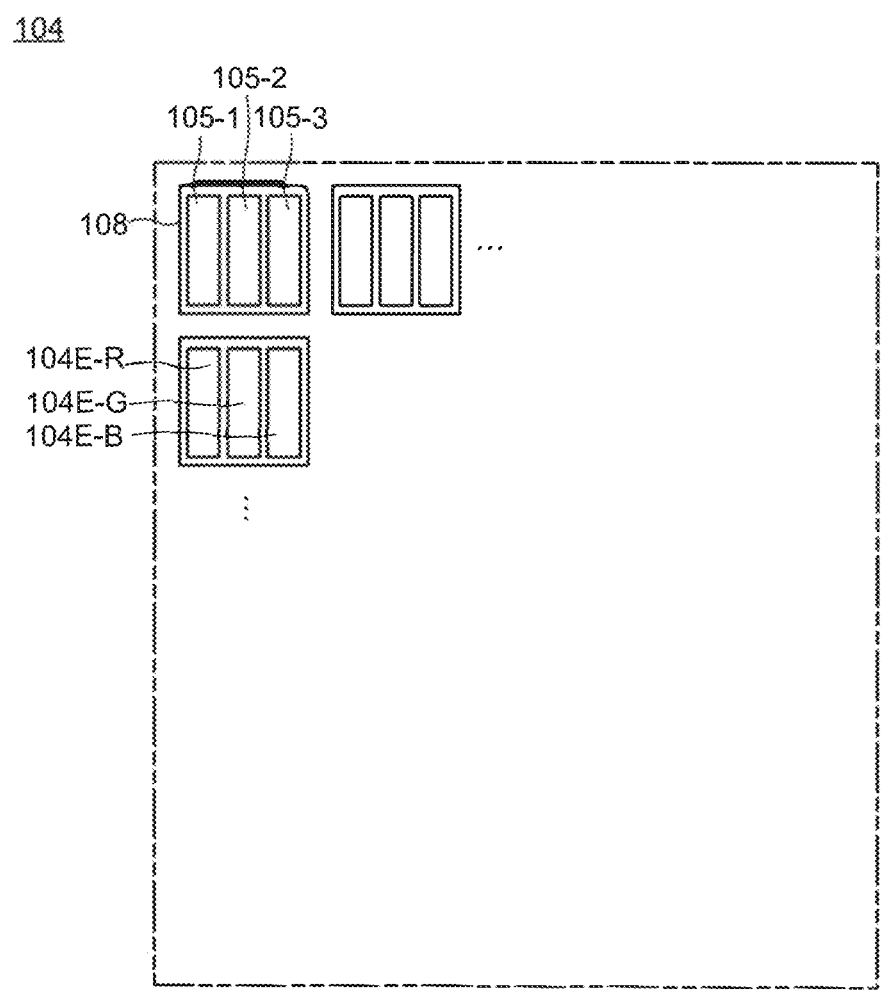
FIG. 7 is a schematic diagram of an arrangement of pixels of a display device according to an embodiment of the present invention.
Figure 8A:
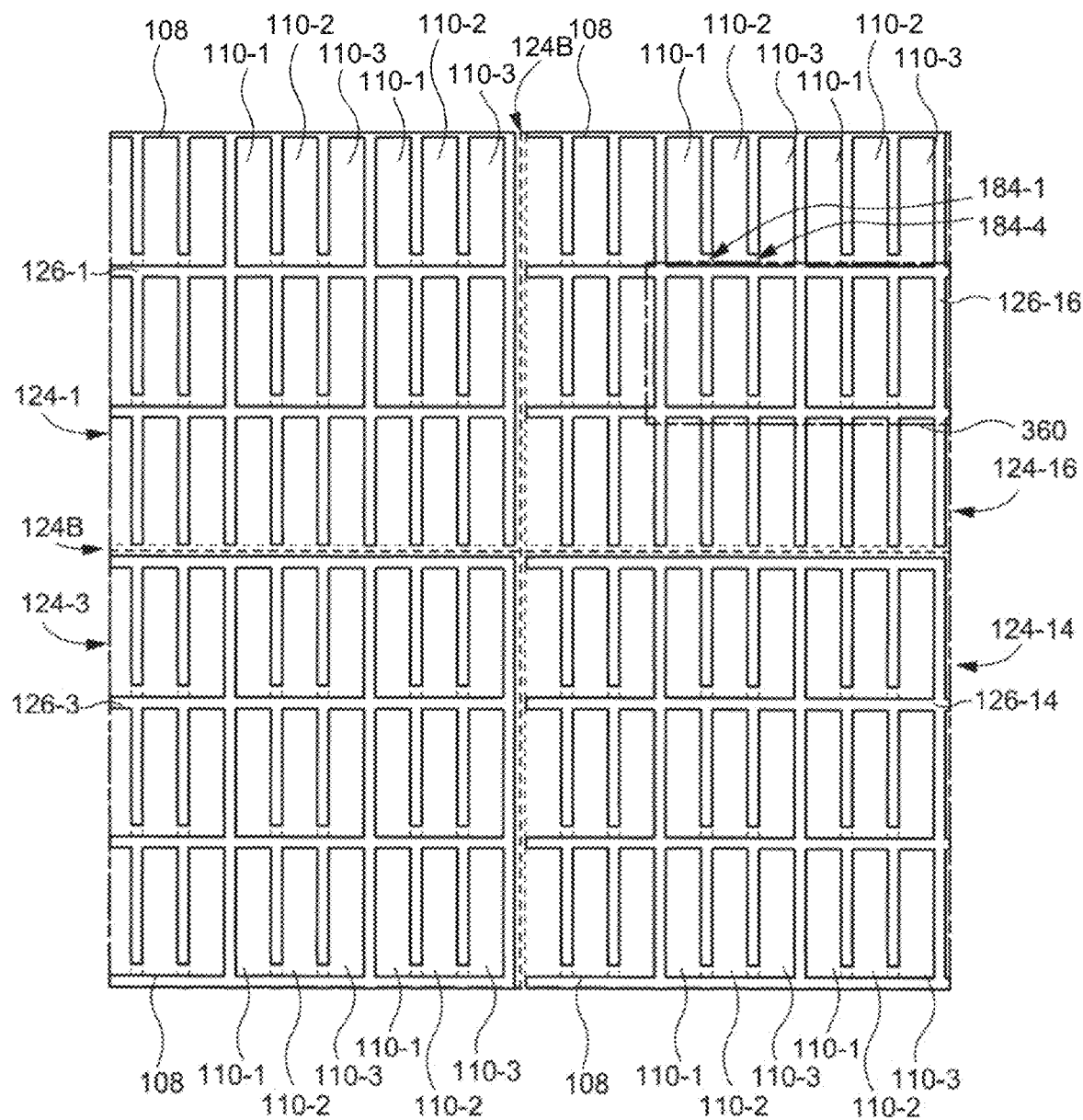
FIG. 8A is a schematic diagram of an arrangement of sensor electrodes of a display device according to an embodiment of the present invention.
Figure 8B:
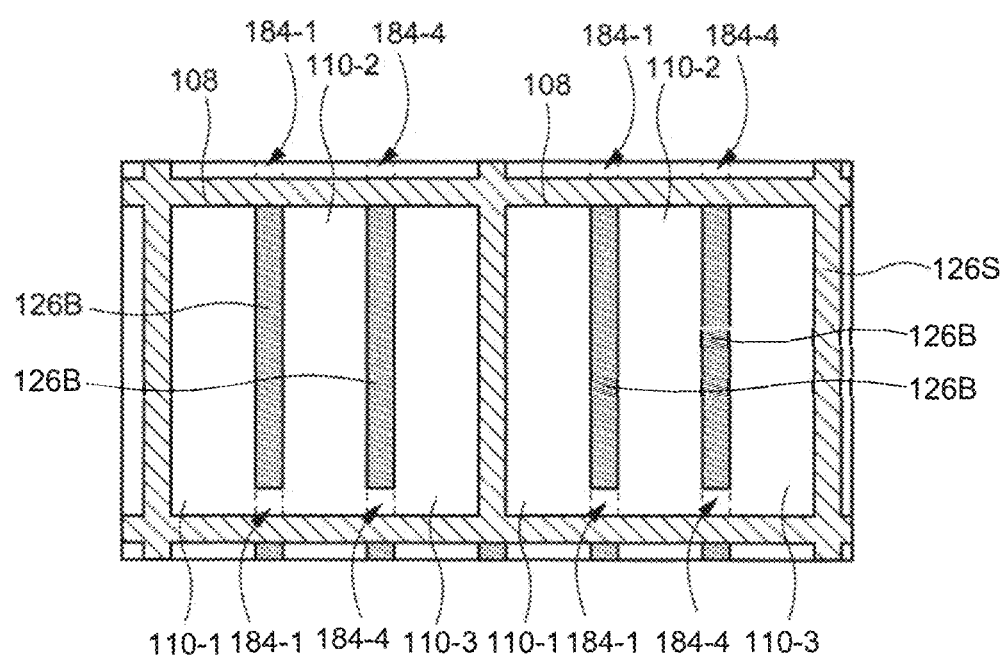
FIG. 8B is a schematic diagram of a configuration of sensor electrodes of a display device according to an embodiment of the present invention.

In addition, the configuration of the display device 10 is not limited to the above-described configuration, and for example, the arrangement of the sub-pixels 110 may be a stripe arrangement as shown in FIG. 7, and the plurality of cut-off portions 184 may be arranged in the sensor electrode 126 as shown in FIG. 8A. FIG. 7 is a diagram schematically showing an arrangement of pixels of a display device according to an embodiment of the present invention, and illustrates a plurality of pixels 108 arranged in the display region 104. FIG. 8A is a diagram schematically showing an arrangement of a sensor electrode of a display device according to an embodiment of the present invention, and is an enlarged top view of a part of the plurality of sensor block 124-1, sensor block 124-3, sensor block 124-14, and sensor block 124-16, which is the portion 300 surrounded by a broken line in FIG. 1. FIG. 8B is a diagram schematically showing a configuration of sensor electrodes of a display device including a sensor electrode according to an embodiment of the present invention, showing a part 360 surrounding a plurality of pixels 108 surrounded by a broken line shown in FIG. 8A and showing an enlarged view of the sensor electrode 126, according to an embodiment of the present invention.

The display device 10 may be arranged with a plurality of sub-pixels 110 in a stripe array, as shown in FIG. 7. The sub-pixel 110-1 is adjacent to the sub-pixel 110-2, and the sub-pixel 110-2 is adjacent to the sub-pixel 110-3. The sub-pixel 110-2 is arranged between the sub-pixel 110-1 and the sub-pixel 110-3.

The sensor electrode 126 may be formed along a boundary of a plurality of sub-pixels 110 arranged in a stripe array and surrounding a periphery of the pixel 108. The sensor electrode 126 can include the plurality of cut-off portions 184. The plurality of cut-off portions 184 may be located between the adjacent sub-pixels 110 in the sensor electrode 126. The cut-off portion 184 may be located along the inner edge of the sensor electrode 126 surrounding the periphery of the pixel. The plurality of cut-off portions 184 are preferably arranged at positions closest to each other in addition to the positions described above.

The cut-off portion 184-1 is located between the sub-pixel 110-1 and the sub-pixel 110-2 in the sensor electrode 126, in the example shown in FIG. 8A and FIG. 8B. The cut-off portion 184-4 is located between the sub-pixel 110-2 and the sub-pixel 110-3. The cut-off portion 184-1 and the cut-off portion 184-4 are arranged at positions closest to each other at the boundary between the sensor electrode 126S and the sensor electrode 126B. The cut-off portion 184-1 is located at a boundary between the sensor electrode 126S and the sensor electrode 126B between the sub-pixel 110-1 and the sub-pixel 110-2, and the cut-off portion 184-4 is located closer to the cut-off portion 184-1 at a boundary between the sensor electrode 126S and the sensor electrode 126B between the sub-pixel 110-2 and the sub-pixel 110-3.

2-3. Third Modification

Figure 9:
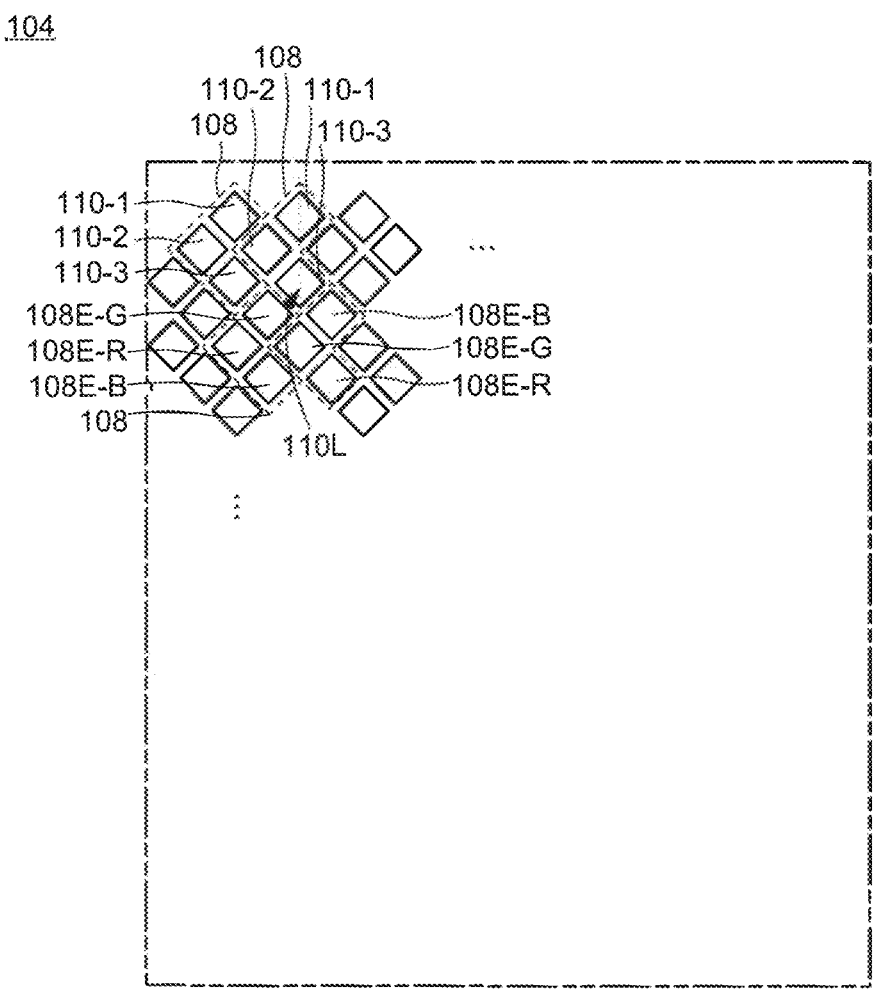
FIG. 9 is a schematic diagram of an arrangement of pixels of a display device according to an embodiment of the present invention.
Figure 10A:
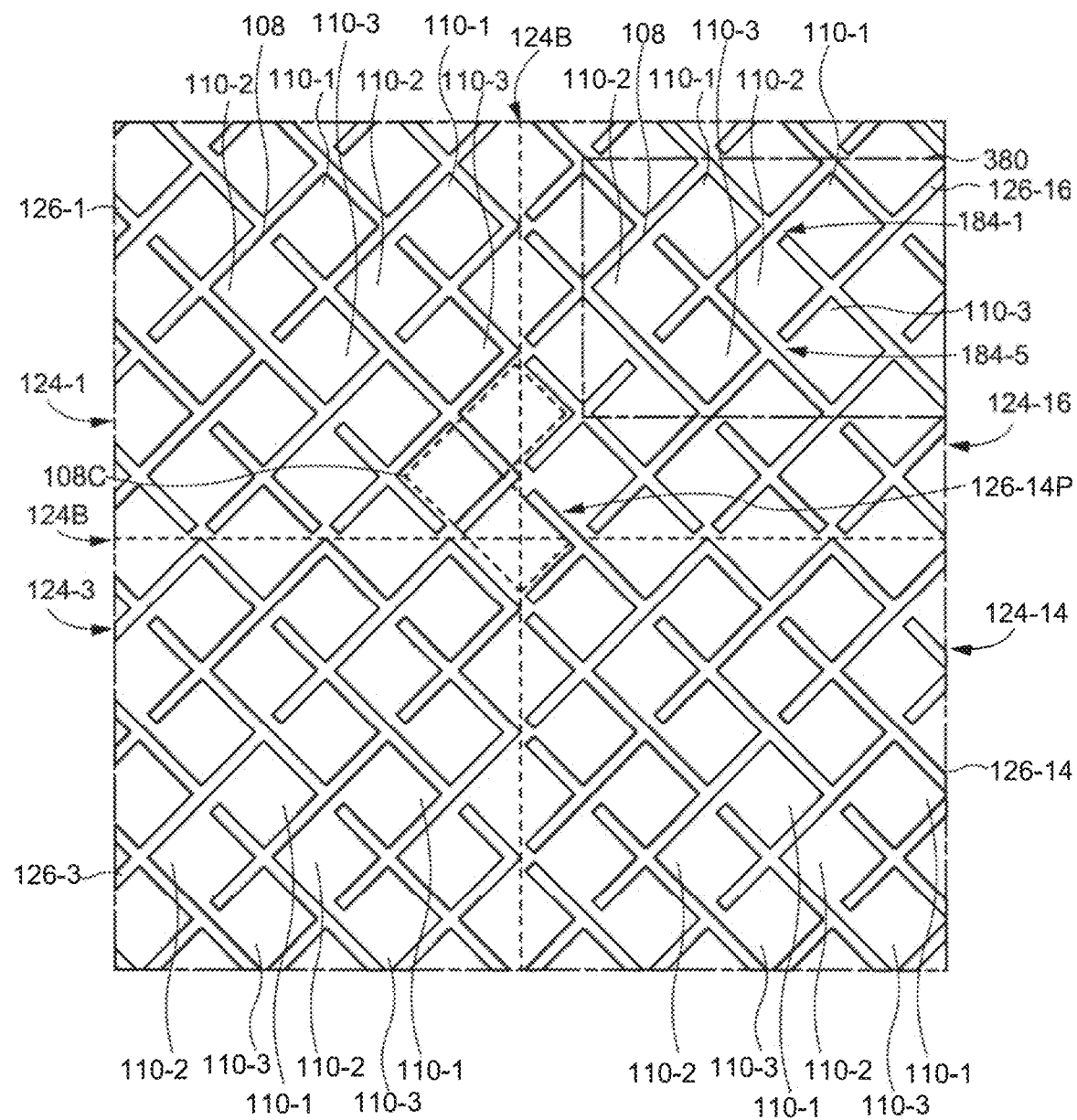
FIG. 10A is a schematic diagram of an arrangement of sensor electrodes of a display device according to an embodiment of the present invention.
Figure 10B:
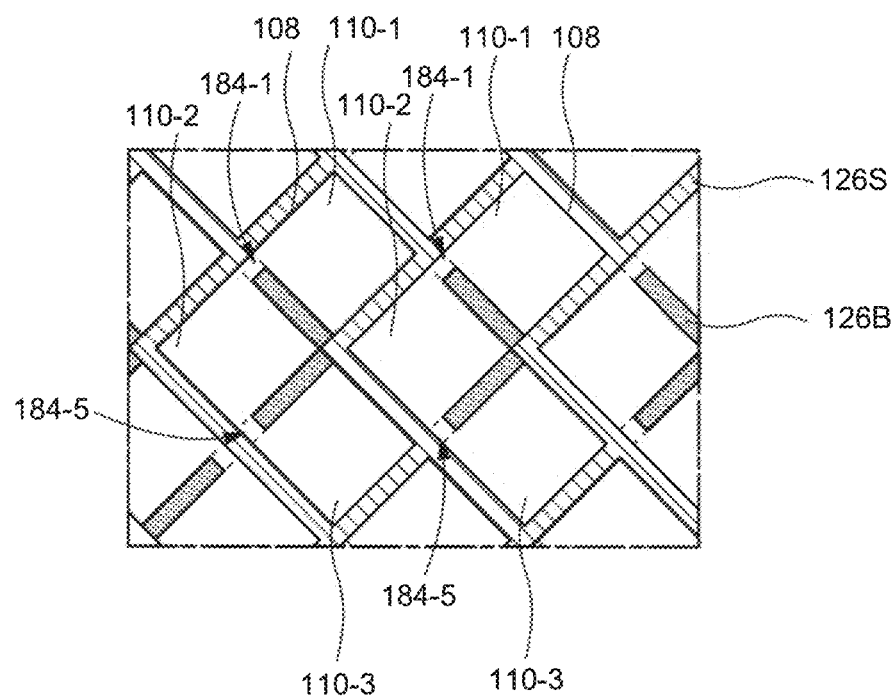
FIG. 10B is a schematic diagram of a configuration of sensor electrodes of a display device according to an embodiment of the present invention.

Further, the configuration of the display device 10 is not limited to the above-described configuration, and for example, as shown in FIG. 9, the sub-pixel 110-1 to the sub-pixel 110-3 may be arranged in a diamond array, and as shown in FIG. 10A and FIG. 10B, the plurality of cut-off portions 184 may be arranged in the sensor electrode 126. FIG. 9 is a diagram schematically showing an arrangement of pixels of a display device according to an embodiment of the present invention, and illustrates a plurality of pixels 108 arranged in the display region 104. FIG. 10A is a diagram schematically showing an arrangement of sensor electrodes of a display device according to an embodiment of the present invention, and shows an enlarged view of a portion 300 of the plurality of the sensor block 124-1, the sensor block 124-3, the sensor block 124-14, and the sensor block 124-16. FIG. 10B is a diagram schematically showing a configuration of sensor electrodes of a display device according to an embodiment of the present invention, and shows a further enlarged view of the sensor electrode 126.

The display device 10 may be disposed with a plurality of sub-pixels 110 in a diamond-array, as shown in FIG. 9. The sub-pixel 110-1 may be adjacent to the sub-pixel 110-2, and the sub-pixel 110-2 may be adjacent to the sub-pixel 110-3. The diagonal of the diamond shape of the sub-pixel 110-1 and the diagonal of the diamond shape of the sub-pixel 110-3 can be aligned on the straight line 110L. The light-emitting element 110E may be arranged corresponding to the sub-pixels 110, and may be arranged in a pentile array.

The sensor electrode 126 may be formed along a boundary of a plurality of sub-pixels 110 arranged in a diamond-array, surrounding a periphery of the pixel 108. The sensor electrode 126 can include the plurality of cut-off portions 184. The plurality of cut-off portions 184 may be located between the adjacent sub-pixels 110 in the sensor electrode 126. The cut-off portion 184 may be located along an inner edge of the sensor electrode 126 surrounding the periphery of the pixel 108. The cut-off portion 184 may be located at a boundary between the sensor electrode 126S and the sensor electrode 126B.

The sensor electrode 126 may surround the periphery of the pixel 108C arranged across the plurality of sensor blocks 124 together with the sensor electrode 126 spaced apart from each other and arranged in the other sensor blocks 124. The pixel 108C is arranged across the sensor block 124-1, the sensor block 124-3, the sensor block 124-14, and the sensor block 124-16, in the example shown in FIG. 10A. The periphery of the pixel 108C is surrounded by the sensor electrode 126 arranged in each of the sensor block 124-1, the sensor block 124-3, the sensor block 124-14, and the sensor block 124-16.

The sensor electrode 126-14 arranged in the sensor block 124-14 may have a portion 126-14P extending to the sensor block 124-16, in the sensor electrode 126 surrounding the periphery of the pixel 108C. The extending portion 126-14P is spaced apart from the sensor electrode 126-16 and is contiguous with the sensor electrode 126-14 located in the sensor block 124-14. In the case where the pixel 108C is located at the boundary of the sensor block 124, the sensor electrode 126 located in the plurality of sensor blocks 124 is contiguous with at least one the sensor electrodes 126.

Next, the configuration of the sensor electrode 126 will be described with reference to FIG. 10B. FIG. 10B is a diagram schematically showing a configuration of sensor electrodes of a display device according to an embodiment of the present invention. FIG. 10B shows a portion 380 surrounded by the broken line in FIG. 10A and shows an enlarged view of the sensor electrode 126 surrounding the plurality of pixels 108.

The sensor electrode 126 may be formed along a boundary of the plurality of sub-pixels 110 arranged in a diamond-array, surrounding a periphery of the pixel 108. The sensor electrode 126 can include the plurality of cut-off portions 184. The plurality of cut-off portions 184 may be located between the adjacent sub-pixels 110 in the sensor electrode 126. The cut-off portion 184 may be located along the inner edge of the sensor electrode 126 surrounding the periphery of the pixel. The plurality of cut-off portions 184 are preferably arranged at positions farthest from each other in addition to the positions described above. In the sub-pixel 110 in which the plurality of cut-off portions 184 is arranged between the adjacent sub-pixels 110, the plurality of cut-off portions 184 may be arranged diagonally.

The sub-pixel 110-2 includes the cut-off portion 184-1 and a cut-off portion 184-5 between the sub-pixel 110-1 and the sub-pixel 110-3, respectively, in the example shown in FIG. 10A and FIG. 10B. The cut-off portion 184-1 and the cut-off portion 184-5 are arranged at positions farthest from each other at the boundary between the sensor electrode 126S and the sensor electrode 126B. The cut-off portion 184-1 and the cut-off portion 184-5 are located diagonally above the sub-pixel 110-2.

2-4. Fourth Modification

Figure 11A:
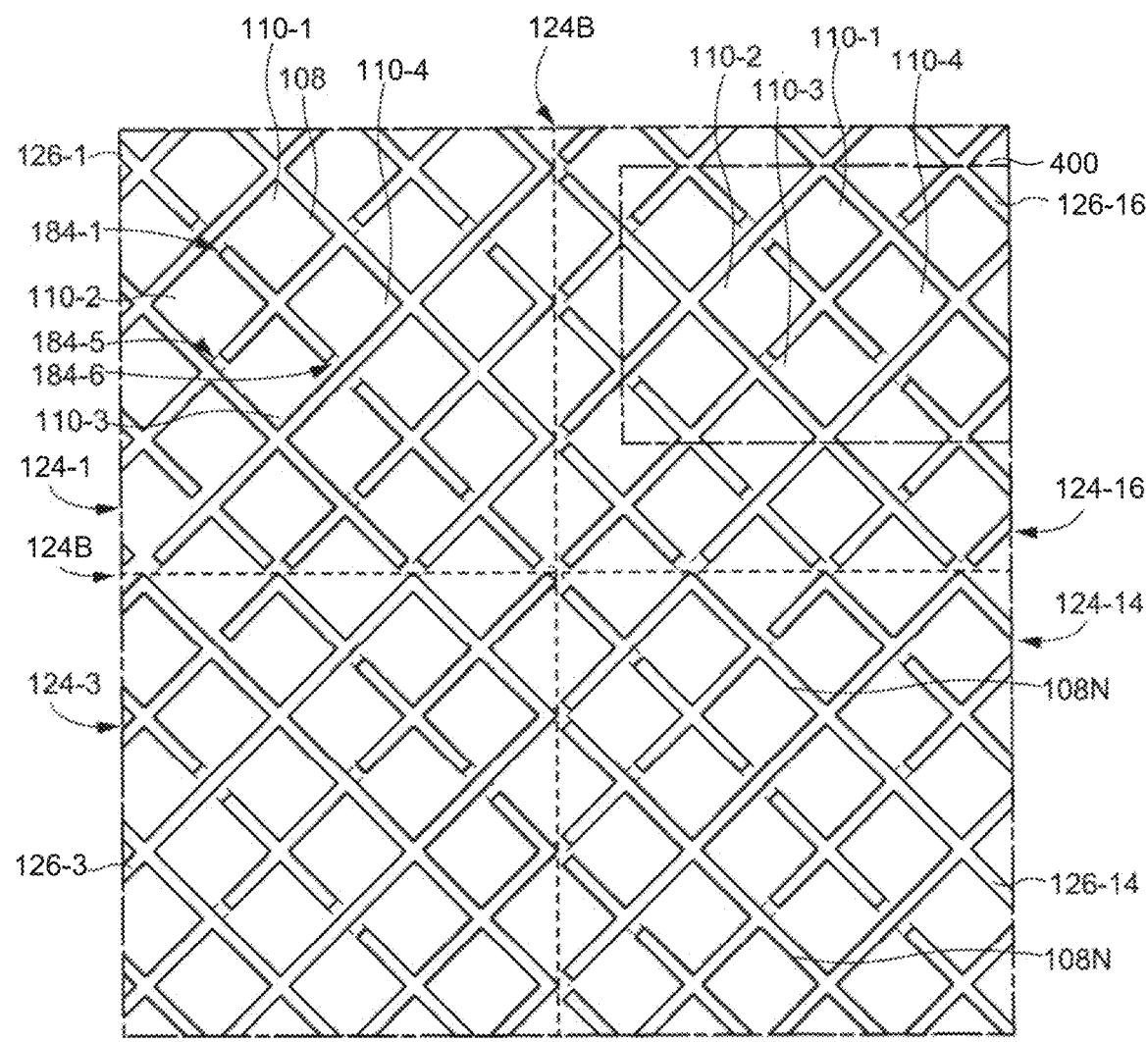
FIG. 11A is a schematic diagram of an arrangement of sensor electrodes of a display device according to an embodiment of the present invention.
Figure 11B:
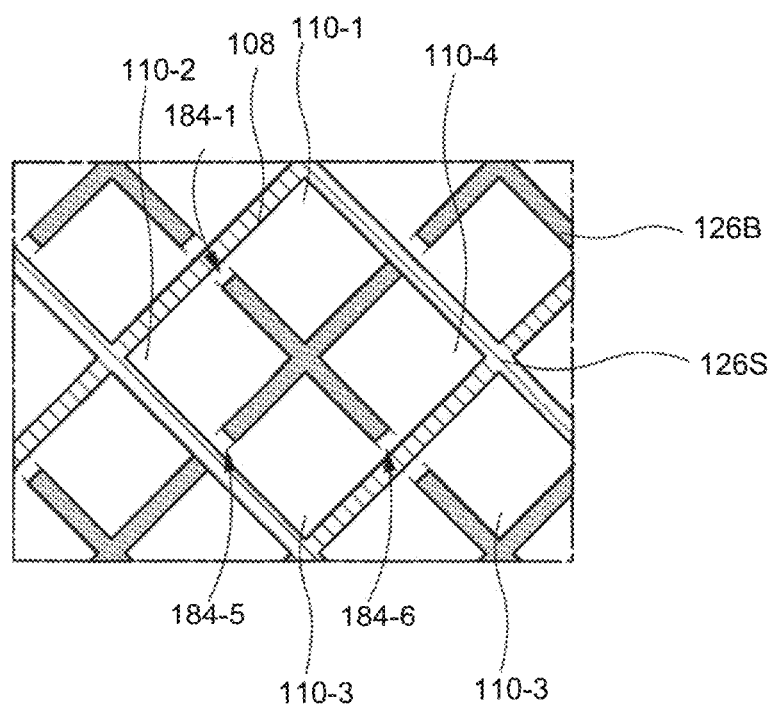
FIG. 11B is a schematic diagram of a configuration of sensor electrodes of a display device according to an embodiment of the present invention.

Alternatively, the configuration of the display device 10 is not limited to the above-described configuration, and four or more sub-pixels 110 may be arranged in the pixel 108, and the plurality of cut-off portions 184 may be arranged in the sensor electrode 126, as shown in FIG. 11A and FIG. 11B. FIG. 11A is a diagram schematically showing an arrangement of sensor electrodes of a display device according to an embodiment of the present invention. FIG. 11A shows a portion 300 surrounded by a broken line shown in FIG. 1, and is an enlarged top view of part of the plurality of the sensor block 124-1, the sensor block 124-3, the sensor block 124-14, and the sensor block 124-16. FIG. 11B shows an enlarged view of a portion 400 of the plurality of sensor block 124-1, the sensor block 124-3, the sensor block 124-14, and the sensor block 124-16. FIG. 11B is a diagram schematically showing a configuration of sensor electrodes of a display device according to an embodiment of the present invention, and shows a further enlarged view of the sensor electrode 126.

The display device 10 may include four or more subpixels 110 in one pixel, the subpixel 110-1 may be adjacent to the subpixel 110-2 and the subpixel 110-4, and the subpixel 110-3 may be adjacent to the subpixel 110-2 and the subpixel 110-4. The sub-pixel 110-1 and the sub-pixel 110-3 may be diagonally arranged, and the sub-pixel 110-2 and the sub-pixel 110-4 may be diagonally arranged. The light-emitting element 110E may be arranged corresponding to the sub-pixels 110, and may be arranged in a pentile-array.

The sensor electrode 126 may further have a cut-off toward the other sensor block 124 at the periphery of the pixel 108N that partially reaches the boundary of the sensor block 124. The cut-off portion allows the sensor electrode 126 arranged in the sensor block 124-14 and the sensor electrode 126 arranged in the sensor block 124-3 to be separated from each other.

The pixel 108N located in the sensor block 124-14 partially reaches the boundary with the sensor block 124-3, in the example shown in FIG. 11A. The sensor electrode 126 arranged in the sensor block 124-14 has a cut-off portion toward the sensor block 124-3 at the periphery of the pixel 108N.

The sensor electrode 126 may further include a cut-off portion 184-6 between the sub-pixel 110-3 and the sub-pixel 110-4. The cut-off portion 184-6 may be located along the inner edge of the sensor electrode 126 surrounding the periphery of the pixel, as shown in FIG. 11B. The cut-off portion 184-6 may be located at an interface between the sensor electrode 126S and the sensor electrode 126B.

Each of the embodiments described above as an embodiment of the present invention can be appropriately combined and implemented as long as no contradiction is caused. The addition, deletion, or design change of components, or the addition, deletion, or condition change of processes as appropriate by those skilled in the art based on each embodiment including modifications are also included in the scope of the present invention as long as they are provided with the gist of the present invention.

It is to be understood that the present invention provides other operational effects that are different from the operational effects provided by the aspects of the above-described embodiments, and also includes those that are obvious from the description of the present specification or that can be easily predicted by a person skilled in the art.

What is claimed is:

1. A display device comprising:
   at least one pixel including a plurality of sub-pixels; and
   a linear sensor electrode extending along a boundary of the plurality of sub-pixels and continuously surrounding a periphery of the at least one pixel,
   wherein the sensor electrode has at least one cut-off portion at the boundary of the plurality of sub-pixels,
   wherein the sensor electrode includes a first sensor electrode extending along the boundary of the plurality of sub-pixels and a second sensor electrode continuously surrounding the periphery of the at least one pixel and being continuous from the first sensor electrode, and
   wherein the at least one cut-off portion is arranged at a boundary of the first sensor electrode with the second sensor electrode.

2. The display device according to claim 1,
   wherein the plurality of sub-pixels includes a first sub-pixel displaying a first color, a second sub-pixel displaying a second color and a third sub-pixel displaying a third color,
   the first color is different from the second color and the third color, and
   the second color is different from the third color.

3. The display device according to claim 2,
   wherein the first sub-pixel is adjacent to the second sub-pixel and the third sub-pixel,
   the second sub-pixel is adjacent to the third sub-pixel,
   the at least one cut-off portion includes:
      a first cut-off portion at a boundary between the first sub-pixel and the second sub-pixel and
      a second cut-off portion at a boundary between the first sub-pixel and the third sub-pixel.

* * * * *